Figure 7:
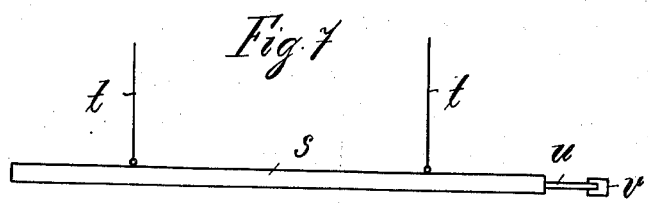

H. FRAHM.
DEVICE FOR DAMPING VIBRATIONS OF BODIES.
APPLICATION FILED OCT. 30, 1909.
989,958.
Patented Apr. 18, 1911.
5 SHEETS—SHEET 1.
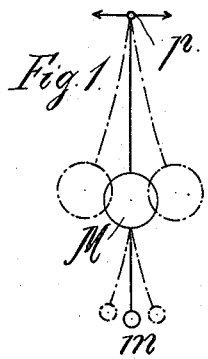
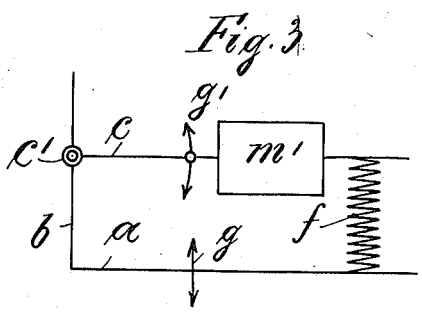
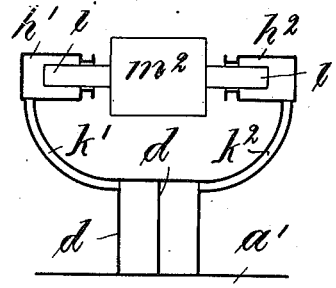
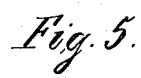
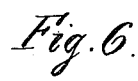
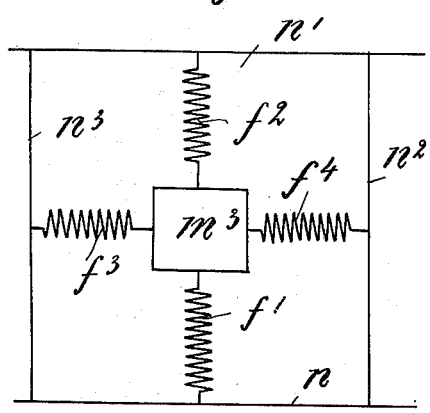
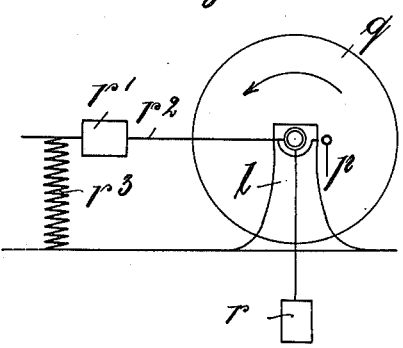
Witnesses:
Alfred Lyons
James H. Griggin
Inventor:
Hermann Frahm
by L. K. Böhm,
Attorney H. FRAHM.
DEVICE FOR DAMPING VIBRATIONS OF BODIES.
APPLICATION FILED OCT. 30, 1909.

989,958.

Patented Apr. 18, 1911

5 SHEETS—SHEET 2.

Witnesses:
Alfred Lyons.
James H. Goggin.

Inventor:
Hermann Frahm
by L. K. Böhm,
Attorney

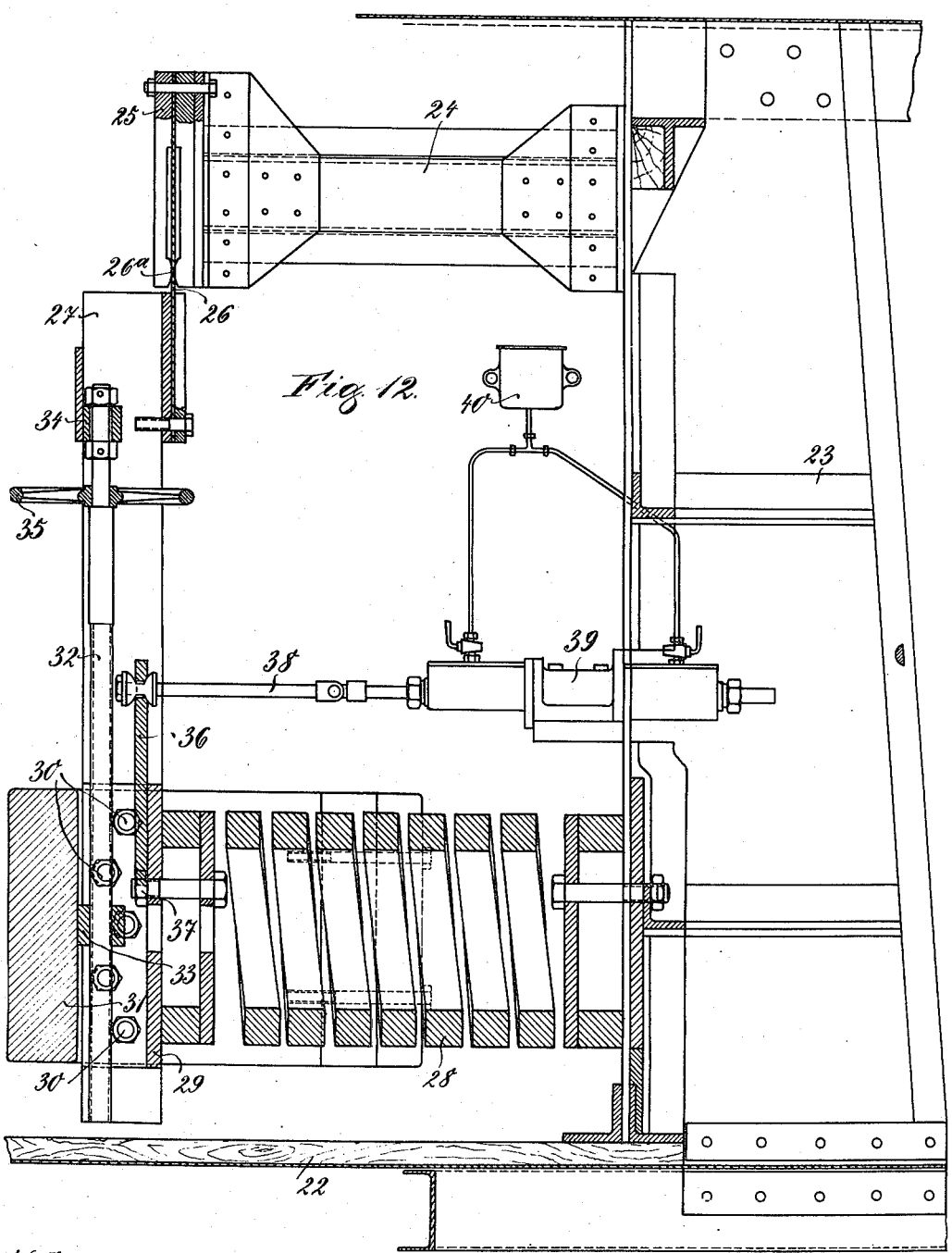

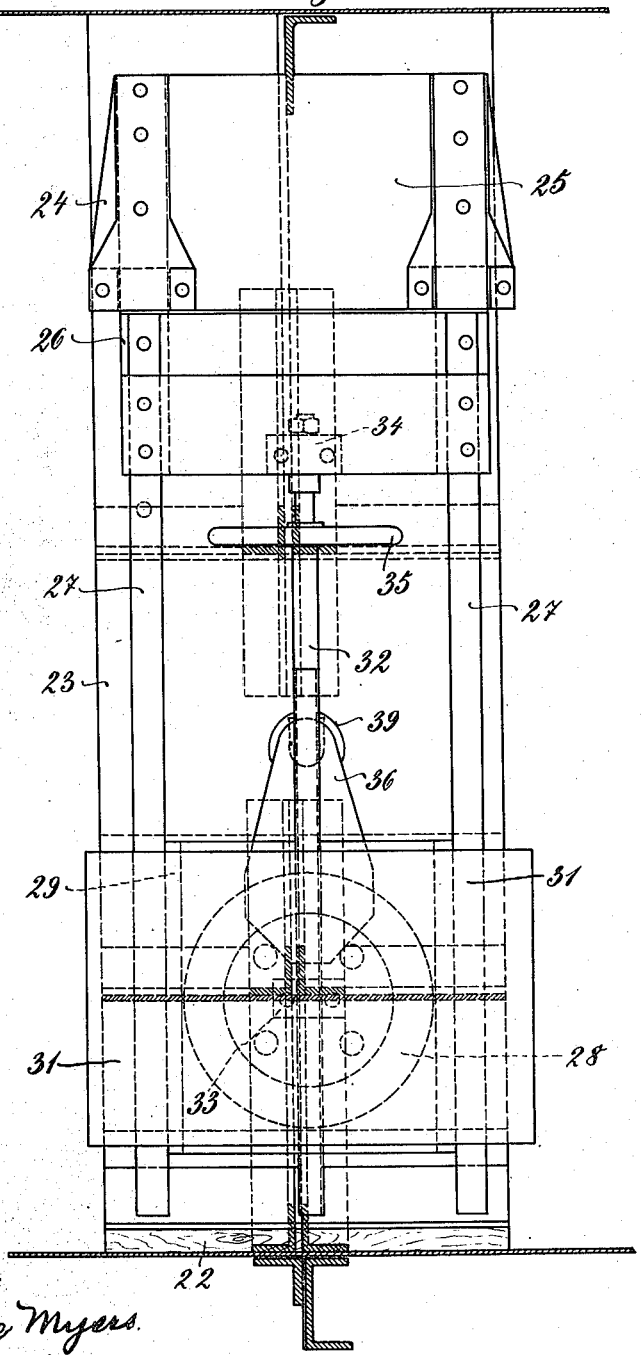

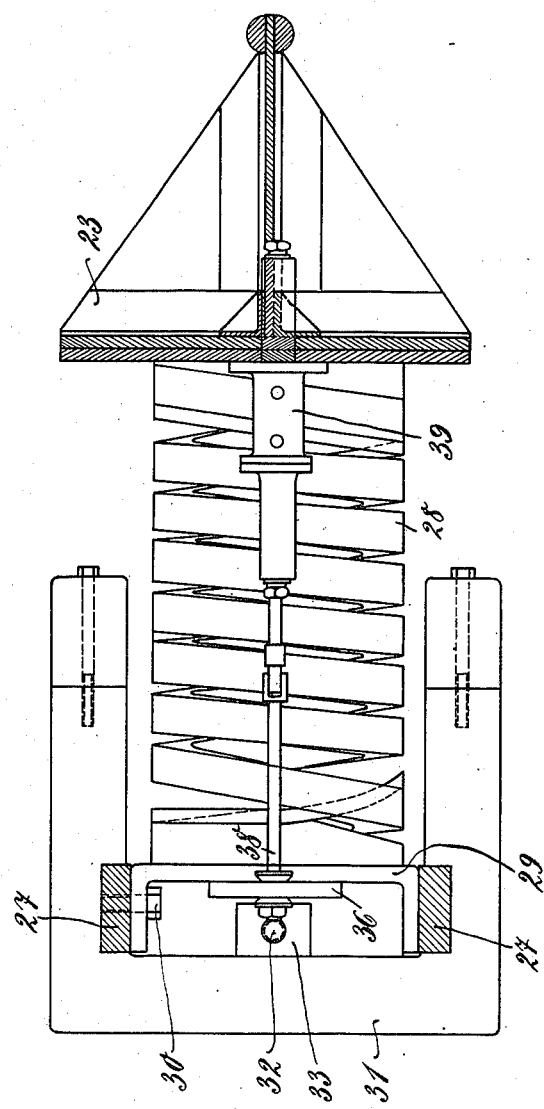

UNITED STATES PATENT OFFICE.

HERMANN FRAHM, OF HAMBURG, GERMANY.

DEVICE FOR DAMPING VIBRATIONS OF BODIES.

989,958.  Specification of Letters Patent.  Patented Apr. 18, 1911.

Application filed October 30, 1909. Serial No. 525,455.

*To all whom it may concern:*

Be it known that I, HERMANN FRAHM, a citizen of the free town of Hamburg, and resident of 18 Kloster Alle, in the free town of Hamburg, German Empire, engineer, have invented a new and useful Device for Damping Vibrations of Bodies, of which the following is a specification.

This invention relates to means for damping the resonance-vibrations which arise in bodies subjected to certain periodic impacts. Such bodies are for instance ships which are subjected to periodic vibratory forces from their propelling machinery or from their propellers. As is known in such ships as soon as the impacts are in harmony with the natural oscillations of the ship the ship starts vibrating more or less. Such vibrations however are not confined to ships but are also present in air ships, aeroplanes and railway and street vehicles. Further the same phenomena are evident in fixed bodies such as buildings when vehicles pass near them, or when machines are working within them. Such vibrations which I shall call resonance vibrations, may even be strong enough in ships, buildings and so on as to render the same unbearable or render the execution of fine measurement or other work in said buildings, ships and so on impossible.

According to the present invention these disturbing vibrations are avoided or damped by means of an auxiliary body which is arranged within or on the main body whose vibrations are to be damped. This auxiliary body is caused to vibrate by the vibrations of the main body and the natural vibrations of the auxiliary body have as nearly as possible the same period as those of the main body. The action of this device depends upon the fact that the resonance vibrations of the main body are annulled by the secondary resonance vibrations of the smaller auxiliary body. The member joining the auxiliary to the main body exercises a reaction on the main body owing to the phase difference, which is directed against the primary disturbing impacts on the main body.

The invention will be more readily understood from the following description of the diagrams contained in the drawings.

Figure 8:
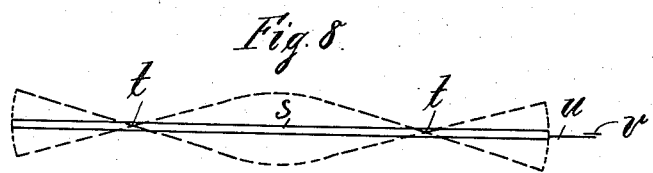
Figure 9:
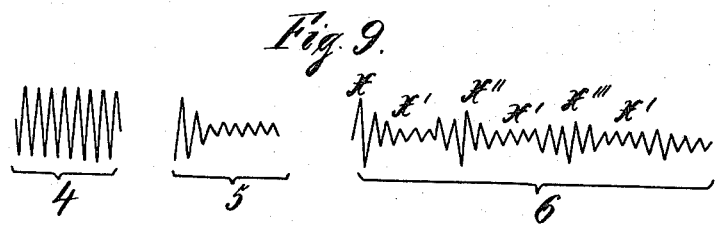
Figure 10:
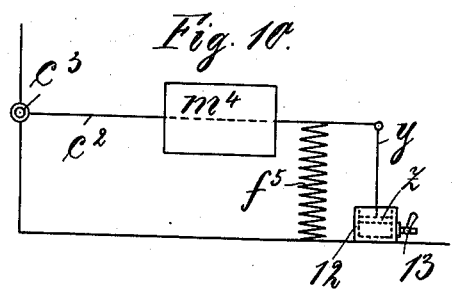
Figure 10A:
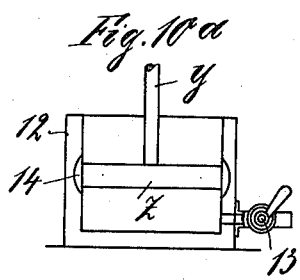
Figure 11:
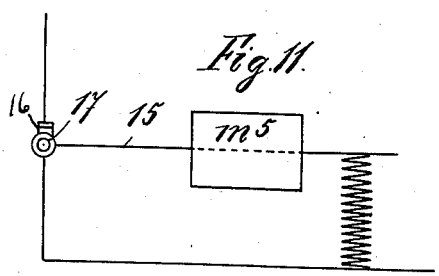
Figure 11A:
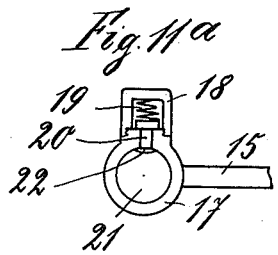

In these diagrams Figure 1 illustrates the fundamental principle of the present invention, Fig. 2 is a diagram showing the method in which the action of the primary impacts is annulled. Fig. 3 is a diagrammatic view showing one method of applying the present invention to a ship or the like. Fig. 4 illustrates diagrammatically a modified construction. Fig. 5 illustrates diagrammatically a device for damping or nullifying vibrations in any direction. Fig. 6 illustrates how the invention may be applied in the case where the disturbing impulses are caused by a rotary member. Fig. 7 is a diagrammatic side view and Fig. 8 is a diagrammatic plan illustrating a method of modifying the action of the auxiliary bodies. Fig. 9 contains curves showing the varying action of the damping device. Fig. 10 is a diagrammatic view illustrating an arrangement by which the damping action of the auxiliary body may be regulated. Fig. 10$^a$ is an enlarged detail of the regulating device. Fig. 11 illustrates a modified form of the device shown in Fig. 10, and Fig. 11$^a$ is a cross sectional detail view of the regulating means. Fig. 12 is a side view partly in section showing one method of constructing the invention; the arrangement being somewhat similar to that shown at Fig. 10 and being particularly applicable for ships and like vehicles. Fig. 13 is an end view of Fig. 12. Fig. 14 is a cross-section through Figs. 12 and 13.

Referring to Figs. 1 and 2 M represents the main body which is subjected to periodic impacts. These periodic impacts are assumed to have the effect of causing the pendulum M to swing. The periodic impulses may be represented by the double arrow $p$. From the pendulum M there is suspended a small pendulum $m$, which represents the auxiliary body according to the present invention.

In Fig. 2 the full line 1 represents the disturbing impacts or force $p\ p$ which causes the vibratory movement of the pendulum M. The vibratory movement of the pendulum M has a phase-difference of 90° to that of the disturbing force. This vibratory movement of the pendulum M is represented by the line 2 in Fig. 2. The small auxiliary body $m$ is also caused to vibrate and this vibration has a phase difference of 90° to the vibration of the pendulum M. This vibration of the auxiliary pendulum $m$ is represented by the sinuous line 3 in Fig. 2. It will be seen that the sinuous line 3 has a phase difference of 180° to the sinuous line 1 and thereby the vibrations of the small auxiliary body $m$ act against the disturbing forces 1 to damp or annul the same. In reality with the device described the mass M will be brought to rest while the forces $p\ p$ still continue to act on its point of suspension.

A form of the device suitable for use in a ship is shown in Fig. 3. $a$ represents any suitable deck on a ship and $b$ represents a vertical wall or bulk head. At the point $c'$ there is fixed a rod $c$ carrying a mass $m'$ which may be slidable on the rod $c$ so as to enable adjustment of the period of vibration of the mass $m'$. A spring $f$ may be arranged between the arm $c$ and the floor $a$. If the floor is subjected to a disturbing force which acts in the lines $g$ the floor $a$ will be caused to vibrate and thereby the mass $m'$ will also vibrate in the lines $g'$. The result will be that the vibrations of the auxiliary mass $m'$ will annul or damp the action of the disturbing forces and the deck $a$ will remain steady. The adjustment of the action of the auxiliary mass $m'$ may be effected by altering the mass itself or altering the spring $f$. The frequency of the vibrations may be altered by altering the position of the weight. The action may also be adjusted by altering the length of the spring or applying a direct load to it.

Fig. 3 shows only the method of counteracting the vibration in a vertical plane. The device may of course be very considerably varied, as for instance is shown in Fig. 4.

In Fig. 4 the supporting arm $c$ is dispensed with and the mass $m^2$ is in the form of a piston or is provided with ends $i\ i$ which act as pistons and are adapted to move in cylinders $h'\ h^2$. The cylinders $h'\ h^2$ may be filled with any suitable medium such as compressed air, and are connected by tubes $k'\ k^2$ to a box $d$ having a central division plate $d'$. The horizontal vibrations of the floor $a'$ will be counteracted by the secondary vibrations of the mass $m^2$. The pressure of the air within the cylinders $h'\ h^2$ may be of any desired amount and by using high pressures the cylinders $h'\ h^2$ may be correspondingly reduced in size. The piston or mass $m^2$ may be suspended after the manner of a pendulum or supported by top and bottom cushion cylinders as shown in Fig. 5 with springs.

In Fig. 5 there is illustrated a method of counteracting vibratory motions either in a vertical or a horizontal plane. The mass $m^3$ is supported by springs $f'\ f^2\ f^3\ f^4$ from the walls $n,\ n'\ n^2\ n^3$. In this way the mass $m^3$ will respond to vibrations in any direction and damp or nullify the same in the manner above described.

In Fig. 6 there is illustrated the application of the present invention to the damping of vibrations caused by a rotating body. The body $q$ having its center of gravity at $p$ is assumed to rotate in the direction of the arrow in Fig. 6. This rotation will cause a periodic force to be applied to the supporting floor through the bearing block $l$. These vibrations which may be vertical, horizontal or in an inclined direction, are damped or avoided by arranging an auxiliary mass $r$ as a pendulum fixed to the bearing and arranging also a mass $r'$ horizontally on an arm $r^2$ which is supported on a spring $r^3$.

It will be understood that the position at which the devices herein described are to be arranged, have to be fixed for each special case. In the case of a machine with rotating parts the vibrations may be avoided by applying the auxiliary oscillating mass on or in the immediate neighborhood of the machine. If the vibrations have to be annulled or damped in a supported body, such as a ship, the device cannot of course be applied at the dead points or axes of the vibrations but at some point where the amplitude of the vibrations is appreciable. Such a point in the case of a ship would be the rear part or a center part of the ship.

It has been discovered that although the auxiliary body exerts a damping action on the vibrations of the main body, the main body is not immediately brought to rest or reduced to vibrations of a minimum amplitude. There occur, what might be called, periods of suspension of the damping action in which the main body after reduction of its amplitude of vibrations again starts to vibrate with a more or less considerable amplitude. Such suspension of the damping action is to be explained by the circumstance that until a certain relationship between the oscillations of the main and the auxiliary masses occurs, these two masses react upon one another in a certain manner. The vibrating main body first causes the auxiliary body to vibrate and these first vibrations of the auxiliary body are so powerful that they react on the main body and apply an oscillating impulse thereto. Although such suspensions of the damping action occur, only at the beginning of the vibrations yet they may be exceedingly disturbing, especially in those cases where the main mass has periods of rest and periods of motion. This would be the case for example in road vehicles and boats, as such bodies frequently alter their velocity and in consequence the parts causing the disturbing vibrations such as the propelling machinery, only impart the critical periodic impulses at a certain velocity corresponding to a certain number of revolutions. The invention relates further to means for preventing such periods of suspension of the damping action and the means employed consist in substance in damping the vibrations of the auxiliary body. The auxiliary body is thereby prevented from vibrating with such large amplitude that it exercises a reactionary force on the main body. In the drawing Figs. 7 and 8 show in elevation and plan a diagram of the device. A lath $s$ is supported at two points by cords $t\ t$; a spring $u$ fixed to the end of the lath forms the auxiliary vibrating mass. The resilient lath $s$ is assumed to be subjected to impulses which cause it to vibrate in the manner shown by the dotted lines in Fig. 8. These vibrations are damped by the spring $u$.

In Fig. 9 the diagram 4 represents the ordinary undisturbed vibrations of the lath $s$. 5 represents a damping action of the spring $u$; it is found however that the spring $u$ has periods when its damping action is suspended so that the amplitude of the vibrations of the lath $s$ is as shown in 6, Fig. 9. Thus the initial vibrations are reduced from the amount $x$ to the amount $x'$ and then these vibrations increase to the amount $x''$. The amplitude of the vibrations is then again reduced to the amount $x'$ and again there enters a period of suspension of the damping action at $x'''$ and so on. The periods of suspension $x''$ and $x'''$ I propose to avoid by damping the vibrations of the auxiliary body $m$ so that the amplitude of these vibrations is restricted and there is no reaction from the auxiliary body to the lath $s$. This may be effected for instance by providing a vane $v$ on the spring $u$. A device suitable for effecting this damping action on the vibrations of the auxiliary body is shown diagrammatically in Fig. 10. The auxiliary mass $m^4$, arm $c^2$ and pivot $c^3$ are arranged as in Fig. 3. A spring $f^5$ is also provided, as in Fig. 3. To the outer end of the arm $c^2$ there is attached a connecting rod $y$ which is articulated to a piston $z$ adapted to slide in a cylinder 12. The cylinder 12 is provided with a cock 13. By adjusting the cock 13 the amount of damping action on the vibrations of the mass $m^4$ may be adjusted. It is desirable that the damping action should act wholly or principally on the mass $m^4$ during the extreme parts of its vibratory motion, while the center part of the vibratory motion of the mass $m^4$ is only slightly braked or not braked at all. This result may be obtained by arranging the cylinder 12 so that the damping action only starts, when vibrations of considerable amplitude occur. The arrangement herein illustrated will be more clearly understood from Fig. 10ª. In this figure the cylinder 12 is provided in its walls with a groove 14 on that part of the cylinder wall opposite which the piston $z$ is normally suspended. When the piston $z$ descends, the only outlet which the air beneath the piston $z$ has, is through the cock 13 and thereby the extreme part of the vibratory motion of the mass $m^4$ is more powerfully braked than the center part of said vibratory motion. If the cylinder 12 is filled with a liquid, the cock 13 should be arranged in a pipe connecting the two ends of the cylinder.

In Fig. 11 the mass $m^5$ is carried by a rod 15 having a braking device at its point of suspension 16 to the side wall. The arrangement of the suspension device for the rod 15 is illustrated in cross section in Fig. 11ª. The rod 15 carries an eye-piece 17 on which a brake cylinder 18 is arranged. The brake cylinder 18 contains an adjustable spring 19 adapted to press a plunger 20. The plunger 20 has its bottom end in Fig. 11ª forming a cord of the circle of the eye piece 17. The pivot 21 on which the eye-piece 17 rotates, is provided with a flattened part 22. It will be seen that the flattened part 22 is so arranged that the arm 15 may make smaller vibrations without bringing the brake into operation. When vibrations of greater amplitude however occur, the plunger 20 comes on the circular part of the pivot 21 and thereby exerts a braking action.

It will be seen that with the arrangements described in Figs. 10 to 11ª that the damping action only occurs with vibrations of greater amplitude such as the vibrations represented by $x''$ in Fig. 9.

One constructional form of carrying out the invention is illustrated at Figs. 12, 13 and 14 as applied to ships, the arrangement being somewhat similar to that shown at Fig. 10; 22 is the deck of the ship and 23 a standard carried thereby, this standard supporting at its upper end a bracket 24 whose outer end is provided with a face plate 25 bolted to the face of the bracket, and interposed therebetween is a flexible blade 26 the lower end of which is bolted to and carries a pair of vertical side bars 27, these bars extending down almost to the deck 22 of the ship but being free at their lower ends, so as to be capable of a swinging movement about the point 26ª at which the blade is held fast between the bracket and face plate. A spring 28 is also carried by the standard 23 at a point near the deck, one end of the spring being secured to the standard 23 and the other end carrying a channel-shaped member 29, which is bolted to the side bars 27 by means of bolts 30, so that by this means the swinging movement of the bars 27 is somewhat counteracted by the action of the spring 28. The side bars 27 carry a yoke-shaped mass 31, which forms the vibrating mass corresponding to the mass $m^4$, Fig. 10, this yoke-shaped member having suitable channels or recesses for the reception of the side bars 27 and it being adapted to be vertically adjusted thereon by means of a vertically screwed shaft 32, working through a nut 33 carried by the mass 31 and being mounted in a bearing 34 carried by the bars 27 at its upper end, said screwed shaft being provided with any suitable operating wheel 35. In order to damp the vibrations of the mass during the extreme parts of its vibratory motion, a bar 36 is bolted to the channel-shaped member 29 at 37, this bar 36 being jointed at its upper end to the articulated connecting rod 38 of a piston working in a cylinder 39, said cylinder working either under compressed air, gas, or liquid. On the drawings I have shown the cylinder as connected with an oil reservoir 40 for feeding oil to the cylinder. The cylinder is provided in the manner already described with ports on each working side of the piston, these ports being connected by means of a connecting pipe not shown on the drawings and means being provided for regulating the inlet to and outlet through said ports. The operation of the device is exactly similar to that described with reference to Fig. 10, and further description thereof is therefore unnecessary.

I claim:—

1. In a body, means for damping or avoiding resonance vibrations, comprising, a secondary body resiliently carried by the body whose vibrations are to be damped, said secondary body being free to be vibrated by the primary vibrations of the body to be damped, substantially as described.

2. In a body, means for damping or avoiding resonance vibrations comprising, a secondary body resiliently carried by the body whose vibrations are to be damped, said secondary body being free to be vibrated by the primary vibrations of the body to be damped, and means for adjusting as desired the vibrations of said secondary body, substantially as described.

3. In a body means for damping or avoiding resonance vibrations, comprising, a secondary body resiliently carried by the body whose vibrations are to be damped, said secondary body being free to be vibrated by the primary vibrations of the body to be damped, and means for damping the oscillations of the secondary body, substantially as described.

4. In a body, means for damping or avoiding resonance vibrations, comprising a secondary body resiliently carried by the body whose vibrations are to be damped, said secondary body being free to be vibrated by the primary vibrations of the body to be damped, means for damping the oscillations of the secondary body and means for regulating said damping action.

5. In a body, means for damping or avoiding resonance vibrations, comprising, a secondary body resiliently carried by the body whose vibrations are to be damped, said secondary body being free to be vibrated by the primary vibrations of the body to be damped, and means for damping the oscillations of the secondary body, such means acting with greater force in the end parts of the vibratory movements of the secondary body.

6. In a body, means for damping or avoiding resonance vibrations, comprising, a secondary body resiliently carried by the body whose vibrations are to be damped, said secondary body being free to be vibrated by the primary vibrations of the body to be damped, means for damping the oscillations of the secondary body, such means acting with greater force in the end parts of the vibratory movements of the secondary body, and means for regulating the amount of the damping action exerted on vibrations of greater amplitude.

7. In a body, means for damping or avoiding resonance vibrations, comprising a secondary body resiliently carried by the body whose vibrations are to be damped, and a fluid pressure brake adapted to damp the vibrations of greater amplitude of said secondary body, substantially as described.

In witness whereof I have hereunto set my hand in the presence of two witnesses.

HERMANN FRAHM.

Witnesses:
ERNEST H. L. MUMMENHOFF.
IDA CHR. HAFERMANN.